UNITED STATES PATENT OFFICE.

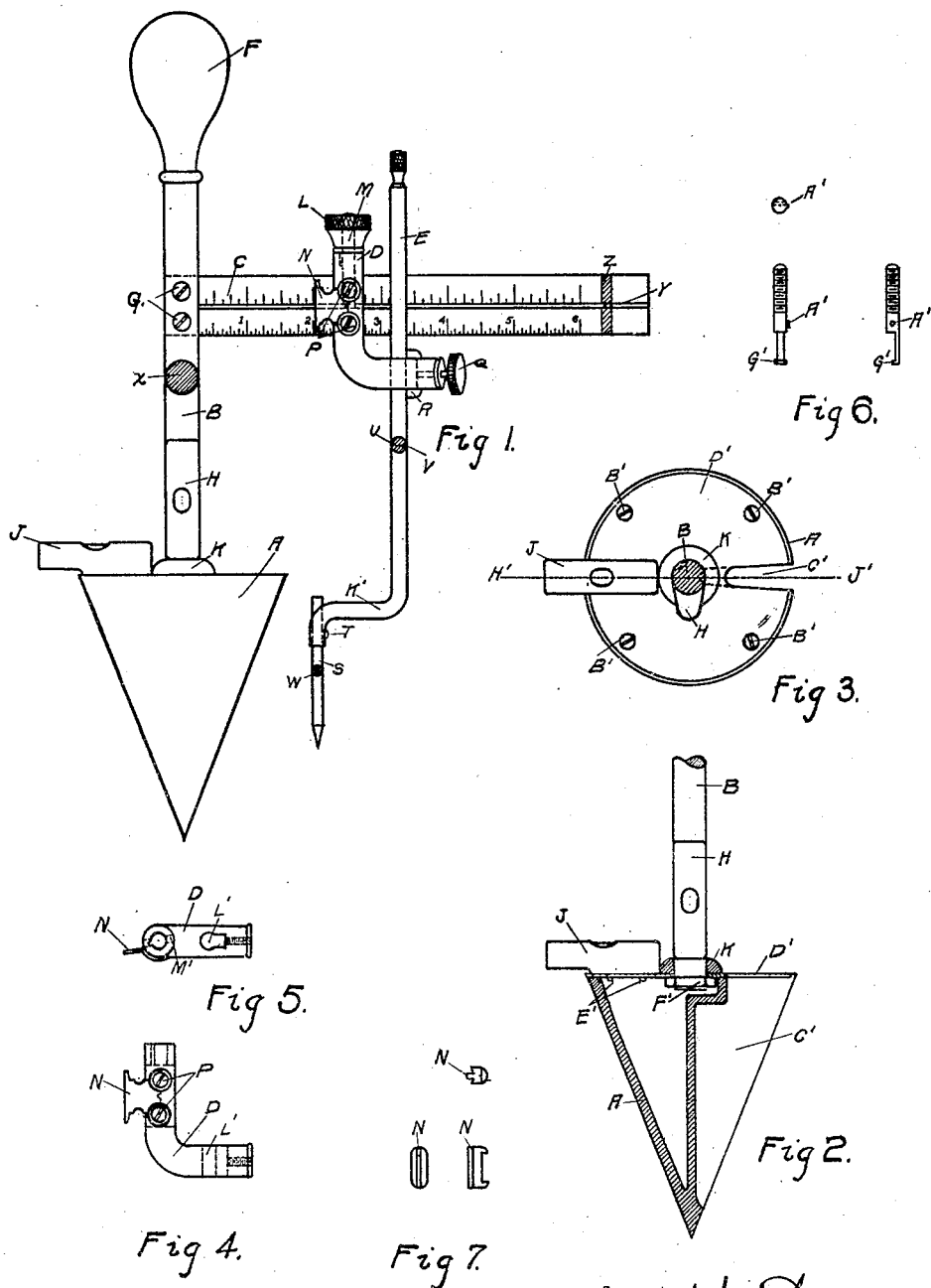

JOSEPH DIRACCA, OF JOLIET, ILLINOIS.

COMPASSES.

962,702.

Specification of Letters Patent. Patented June 28, 1910.

Application filed July 15, 1909. Serial No. 507,721.

*To all whom it may concern:*

Be it known that I, JOSEPH DIRACCA, a citizen of the United States, residing at Joliet, in the county of Will and State of Illinois, have invented certain new and useful Improvements in Compasses, of which the following is a specification.

My invention relates to compasses for indicating circles, and the object of my improvement is to provide a compass that will, when set for marking a circle, accurately indicate the radius of such circle on a graduated scale-plate, and that will accomplish this whether it is desired to mark a circle around an opening or perforation, circular or otherwise, or upon a straight smooth surface, referring mainly to wood and metal material for use in some kind of building or construction.

I attain these objects by the mechanism illustrated in the accompanying drawing, in which—

Figure 1 is a perspective view of the compass; Fig. 2 is a sectional view of the cone taken on line H′ J′, Fig. 3; Fig. 3 is a top view of Fig. 2; Fig. 4 is a side view of arm D, with nut and screws removed; Fig. 5 is a top view of Fig. 4; Fig. 6 shows front, side and top views of piece M, Fig. 1; Fig. 7 shows front, side and top views of piece R, Fig. 1.

The cone A is the base piece of the compass, to which is fastened the center shaft B. Scale plate C is secured to shaft B by the screws G. Holder arm D is slidable on scale plate C. The pointer E is slidable through the arm D. On the end of shaft B is fastened the handle F. On shaft B is fastened the level H for use when marking on a perpendicular surface. The level J fastened to the cone A is for use on horizontal surfaces. The shoulder K is to strengthen the connection of the shaft B with the cone A. The thumb nut L screws onto the screw bolt M which fits movably in the arm D and is held in the arm D by a lug G′ at the end of the screw bolt, and which lug is slidable in the groove Y, so that by turning said nut on said screw, said lug will press against one side of said groove and hold arm D sufficiently rigid in any desired position on the scale plate C. The indicator N is fastened to arm D by the screws P. The thumb screw Q is for setting the pointer E rigidly in the arm D and the plug R is to prevent the pointer E from turning in the arm D. The marking point S is fastened to the arm K′ of the pointer E by the screw T. The groove V in pointer E is for the projection N of the plug R to slide in.

U is a section of pointer E.

The depth of the groove Y is indicated by section Z in Fig. 1, and groove V is indicated by section U, same figure.

W is a section of marking point S, X is a section of shaft B and Z is a section of scale plate C.

The lug A′ is to prevent the screw M from turning in the tubular end of arm D. The screws B′ are to secure cover D′ to cone A. The screws E′ secure the level J to the cover D′. The nut F′ is to hold shaft B to cover D′. The slot C′, penetrating the cone A as shown in Figs. 2 and 3, is to receive point S and arm K′ when the circle to be drawn has a lesser diameter than the cover D′. The point S is secured to the arm K′ by the screw T.

This compass can be used with or without a material center. Without a material center, the point of the cone and the point of marking point S are about on a line parallel with the scale plate; with a material center, the point S is raised according to the depth the cone enters into the center, opening or depression. The slot L′ passes through the center of arm D to receive the pointer E. The slot M′ passes through arm D to receive the scale plate C.

What I claim is—

The improved compass, consisting of the cone A; the center shaft B, rigidly connected with the said cone; the graduated scale-plate C, rigidly connected at right angles with the said shaft B; the arm D, slidable on the said scale-plate C by means of the slot M′, which perforates the said arm D through its longitudinal center, the length and width of the said slot corresponding to the width and thickness of the said scale-plate; the indicator N secured to the said arm D; the pointer E, slidable through the slot L′ which perforates the said arm D; the thumb-screw Q for setting the said pointer E rigidly in the said slot L′; the plug R, inserted in the said slot L′ and fitting into the groove V running lengthwise in said pointer E, to prevent the said pointer E from turning in the said slot L′; the marking point S secured to the arm K, the latter being the end of said pointer E turned to a right angle; the screw-bolt M which fits into the tubular end of the said arm D; the nut L screwed onto the threaded end of the said screw-bolt M; the lug G′, integrally connected with the unthreaded end of the said screw-bolt M, and so positioned, that when the said arm D is slid onto the said scale-plate C, the said lug will enter the groove Y on the said scale-plate, and, consequently, the said arm D can be tightened or loosened on said scale plate by turning the said nut L forward or backward, and the said indicator, pointer and marking point can thus be held rigid at any desired points within the scope of the compass, all substantially as illustrated and set forth.

In testimony whereof I affix my signature in presence of two witnesses.

JOSEPH DIRACCA.

Witnesses:
    STEPHEN A. GOODSPEED,
    JOHN M. WOLFRUM.